N. HOFFMAN.
FEED MECHANISM FOR CARRIAGES OF SAW MILLS OR OTHER MACHINES.
No. 10,968. Reissued Nov. 27, 1888.
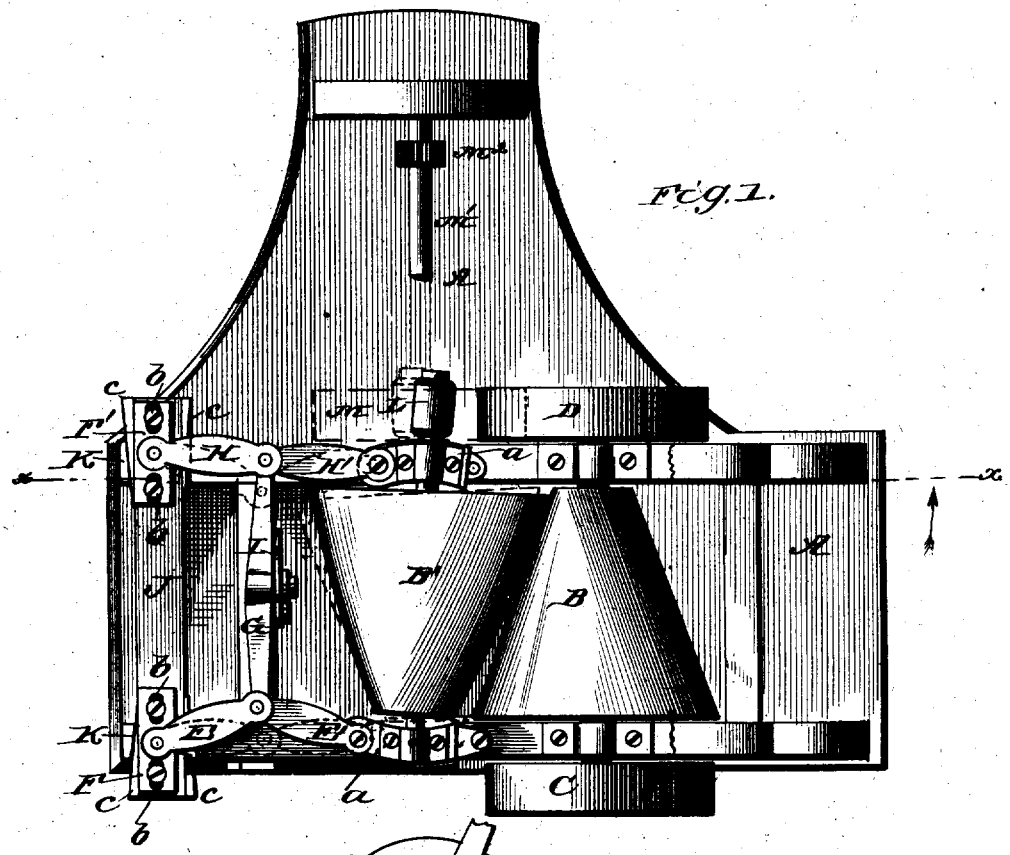
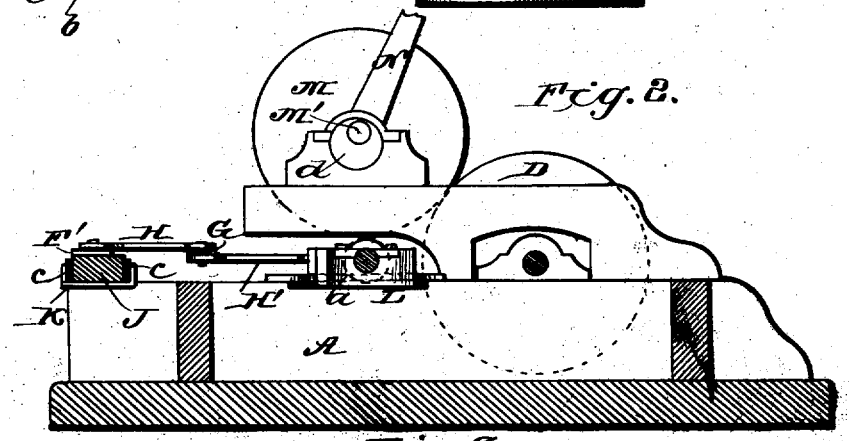
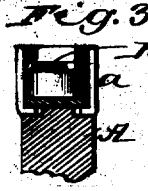
WITNESSES:
Fred G. Dieterich
Edw. W. Byrn.
INVENTOR:
Newton Hoffman.
BY Munn & Co
ATTORNEYS.

UNITED STATES PATENT OFFICE.

NEWTON HOFFMAN, OF ELIZABETH, WEST VIRGINIA.

FEED MECHANISM FOR CARRIAGES OF SAW-MILLS OR OTHER MACHINES.

SPECIFICATION forming part of Reissued Letters Patent No. 10,968, dated November 27, 1888.

Original No. 359,076, dated March 8, 1887. Application for reissue filed October 20, 1888. Serial No. 288,714.

*To all whom it may concern:*

Be it known that I, NEWTON HOFFMAN, of Elizabeth, in the county of Wirt and State of West Virginia, have invented a new and useful Improvement in Feed Mechanism for Carriages of Saw-Mills or other Machines, of which the following is a specification.

My invention relates to feeds for propelling the carriage of saw-mills or other machines back and forth at variable rates of speed, or holding it stationary, as desired; and it consists in a pair of friction cone-pulleys arranged in peripheral contact and placed between the source of power and the carriage-pinion, one of said cone-pulleys being mounted in adjustable boxes which permit its small end to be brought into frictional contact with the large end of its mate, or its large end into frictional contact with the small end of its mate, or the middle line of one to engage the middle line of the other to produce, respectively, a faster, slower, or uniform motion.

My invention also consists in the peculiar means for adjusting the cone-pulley, as will be hereinafter more fully described with reference to the drawings, in which—

Figure 1 is a plan view of a saw-mill feed with the wheel M, hand-lever N, and part of shaft M′ broken away. Fig. 2 is a vertical section through the line *x x* of Fig. 1, and looking in the direction of the arrow; and Fig. 3 is a vertical section through one of the journal-boxes of the adjustable cone-pulley.

A represents the bed-frame, in which is journaled a shaft carrying within the frame a rigidly-attached cone friction-pulley, B, and upon the outside of the frame, at one end, a pulley, C, through which power is received from a driving-belt, and at the other end a friction-pulley, D. Firmly fixed on a shaft beside the cone-pulley B is another cone-pulley, B′, with its larger end opposite the smaller end of its mate. The shaft of this cone-pulley B′ is journaled in boxes *a a*, which have a sliding adjustment on the bed about a curve line struck by a radius from the center of the cone-pulley, the boxes being for this purpose disposed upon fixed metal plates and provided with underlapping lips, (see Fig. 3,) which hold the boxes down and prevent them from rising.

Now, in transmitting motion from the cone B to B′ by frictional contact it will be seen that when the small end of B engages the large end of B′ a slow-motion will be imparted to the shaft of B′, and when the large end of B engages the small end of B′ a fast motion is imparted to the shaft of B′, and when the middle of one cone-pulley engages the middle of the other both revolve at the same speed. To permit these different contacts to be made between the cone-pulleys, B′ is made with its conical face slightly crowning or rounded, and its axis is made adjustable about a central vertical line, as follows: To the journal-box at the small end of cone-pulley B′ is attached one end of a pair of toggle-arms, E E′, the outer arm, E, of which is jointed to a fixed plate, F, on the bed-frame, and the middle joint of which toggle-arms is connected to a bar, G. At the large end of cone B′ another pair of toggle-arms, H H′, connects the journal-box at that end to a fixed plate, F′, on the bed-frame, and the middle joint is connected to the other end of bar G. This bar G is connected to a vertical hand-lever, I, fulcrumed at the bottom to the bed-frame.

The bar G is somewhat shorter than the distance between the outer joints of the toggle-arms, so that when one pair of toggle-arms is straight or in alignment the other pair is projected inwardly toward the hand-lever. The object of this is to make one pair of toggle-arms thrust upon the journal-box at one end of the cone at the same time that it pulls upon the journal-box at the other end. When, therefore, the hand-lever I is thrown so as to straighten the toggle-arms E E′, as in dotted lines, and bend or flex the other toggle-arms, H H′, the small end of friction-cone B′ is projected against the large end of B, and a fast motion is imparted to the shaft of B′. When the hand-lever is moved to its full extent in the opposite direction, the small end of cone B′ is drawn away from the large end of B, and the large end of B′ is thrown into contact with the small end of B, and a slow motion is given to the shaft of B′. When the hand-lever stands vertical or stands half-way between its extreme positions, the middle lines of the two cones are engaged and a uniform motion is transmitted.

To take up looseness or lost motion and adjust the cones to each other to compensate for wear, the outer ends of the toggle-arms are jointed to the plates F F′, which are made adjustable by slots and bolts *b b* on the beam J, and which beam J is adjusted in seats K to or from the cones by wedges *c c*.

To transmit motion of the cone B′ to the saw-carriage, the shaft of cone B′ is provided with a small friction-pulley, L, which bears against a large friction-pulley, M, on a shaft, M′, which also carries the carriage-pinion $M^2$, that engages with the rack or toothed bar on the under side of the saw-carriage in the well-known way. The end of the shaft M′ next to the cone B′ is carried in an eccentric, *d*, in the journal-box, which eccentric is provided with a hand-lever, N, by which the friction pulley M may be engaged with the friction-pulley L to run the carriage forward, or be projected against the large friction-pulley D to run the carriage back. The reverse motion which the large pulley D gives, it will be seen, is very much faster than the forward motion, by reason of the large diameter of pulley D as compared with pulley L. At an intermediate adjustment of hand-lever N the pulley M does not engage either pulley D or L.

Having thus described my invention, what I claim as new is—

1. The combination, with the running-gear of a mill-feed, of a pair of friction-cones having the large end of one adjacent to the small end of the other, one of such cones being made adjustable about an imaginary line passing between the ends of the cone in direction at right angles to its axis to alternately throw its opposite ends into frictional engagement with its mate for regulating the speed, substantially as shown and described.

2. The combination, with the relatively-stationary cone-pulley, of a second cone-pulley arranged in sliding journal-boxes beside it, the toggle-arms E E′ and H H′, having each one end attached to a stationary articulation and the other ends to the journal-boxes, a connecting-bar for the middle joints of the toggle-arms, and a hand-lever connecting with said middle bar, substantially as and for the purpose described.

3. The combination, with the drive-pulley B and the running-gear of the feed-carriage, of the cone-pulley B′, having adjustable journal-boxes, the toggle-arms connecting with said journal-boxes and having a middle connecting-bar and lever, and the plates F F′, connected to the outer ends of the toggle-arms and made adjustable, substantially as shown and described.

4. In a mill-feed, the combination, with running-gear for the carriage and a cone-pulley, of a laterally-oscillating cone-pulley having its axis in the same plane with the first and having its sides made crowning or curved, substantially as and for the purpose described.

NEWTON HOFFMAN.

Witnesses:

E. G. MATHEWS,

JAMES LARNE.